United States Patent
Tenkumo et al.

[15] 3,693,523
[45] Sept. 26, 1972

[54] AUTOMATICALLY WINDING TYPE PHOTOGRAPHIC CAMERA WITH A ROTARY SHUTTER

[72] Inventors: Shohei Tenkumo; Yoshio Kuramoto, both of Sakai-shi, Japan

[73] Assignee: Minolta Camera Co., Ltd., Osaka-shi, Japan

[22] Filed: Feb. 18, 1971

[21] Appl. No.: 116,542

[30] Foreign Application Priority Data

Feb. 18, 1970 Japan ................45/13623

[52] U.S. Cl. .................................95/31 EL, 95/61
[51] Int. Cl. .........................G03b 19/04, G03b 9/26
[58] Field of Search........................95/61, 31 EL

[56] References Cited

UNITED STATES PATENTS

| | | | |
|---|---|---|---|
| 3,257,923 | 6/1966 | Maitani | 95/61 X |
| 3,084,606 | 4/1963 | Goldberg | 95/31 |
| 2,742,834 | 4/1956 | Kondolf | 95/61 X |
| 3,005,377 | 10/1961 | Brault et al. | 95/31 X |
| 3,251,287 | 5/1966 | Maitani | 95/61 |
| 3,448,670 | 6/1969 | Suzuki | 95/31 |

Primary Examiner—Samuel S. Matthews
Assistant Examiner—Michael L. Gellner
Attorney—Watson, Cole, Grindle & Watson

[57] ABSTRACT

The shutter in an automatically winding type photographic camera comprises a rotary shutter which rotates intermittently only in one direction, places the shutter charge into practice while in the process of stopping, and effects the exposure when it rotates. The rotary shaft of the shutter plate in said rotary shutter is supported substantially at its center directly beneath the exposure opening of the camera; the lowermost end of the turning track of said shutter plate is substantially coincided with the bottom of the camera body and the uppermost end thereof is located beneath the eye piece portion of the finder of the camera. In the space beneath said exposure opening there are disposed a shutter driving mechanism having a prime mover for interlocking with said rotary shaft and an automatically winding mechanism for interlocking with said prime mover.

5 Claims, 3 Drawing Figures

PATENTED SEP 26 1972

INVENTOR.

BY

AUTOMATICALLY WINDING TYPE PHOTOGRAPHIC CAMERA WITH A ROTARY SHUTTER

BACKGROUND OF THE INVENTION

The present invention relates to an automatically winding type photographic camera having a rotary shutter and, more particularly, relates to a camera having a rotary shutter which rotates only in one direction, places the shutter charge into practice while in the process of stopping, and effects the exposure when it rotates.

Up to the present time, various automatically winding type photographic cameras have been proposed; however, whether the shutter thereof is a lens shutter or a focal plane shutter, the moving direction is reversed during either shutter charge or shutter release. Also, the shutter mechanism is normally a reciprocating type so that the operation stroke for one cycle including the shutter charge and the shutter release becomes large and the time required for one cycle is long. Accordingly, the advantage of the automatically winding type photographic camera for the continuous snapshot is lost. Moreover, increase of the operation stroke results in enlarging the mechanism concerned with the shutter in the automatically winding mechanism and a large driving torque of the prime mover is required, thereby requiring a large camera size.

OBJECT OF THE INVENTION

One object of the present invention is to provide a photographic camera in automatically winding type cameras, which shortens the time required for one cycle including the shutter charge and the shutter release and improves the continuous snapshot.

Another object of the present invention is to provide a photographic camera for reducing the driving torque of the prime mover in automatically winding type cameras.

A further object of the present invention is to provide an automatically winding type photographic camera which is small in size and good in portability.

A still further object of the present invention is to provide an automatically winding type photographic camera for facilitating the change-over operation to manual winding and automatical winding.

Other objects of the present invention will become apparent from the disclosed embodiment with reference to the accompanying drawings.

SUMMARY OF THE INVENTION

In order to attain the above-mentioned objects, the present invention relates to an automatically winding type photographic camera having a rotary shutter rotates in only one direction, places the shutter charge into practice while in the process of stopping, and effects the exposure when it rotates. The rotary shaft of the shutter plate of said rotary shutter is supported substantially at the center directly beneath the exposure opening of the camera; the lowermost end of the turning track of said shutter plate is substantially coincident with the bottom of the camera and the uppermost end thereof is located beneath the eye piece portion of the finder of the camera. In the space beneath said exposure opening there are disposed a shutter driving mechanism having a prime mover for interlocking with said rotary shutter and an automatically winding mechanism for interlocking with said prime mover.

BRIEF DESCRIPTION OF THE DRAWINGS

The drawings show an embodiment of the automatically winding type single reflex photographic camera having a rotary shutter in accordance with the present invention, wherein.

DESCRIPTION OF THE PREFERRED EMBODIMENT

Figure 1:
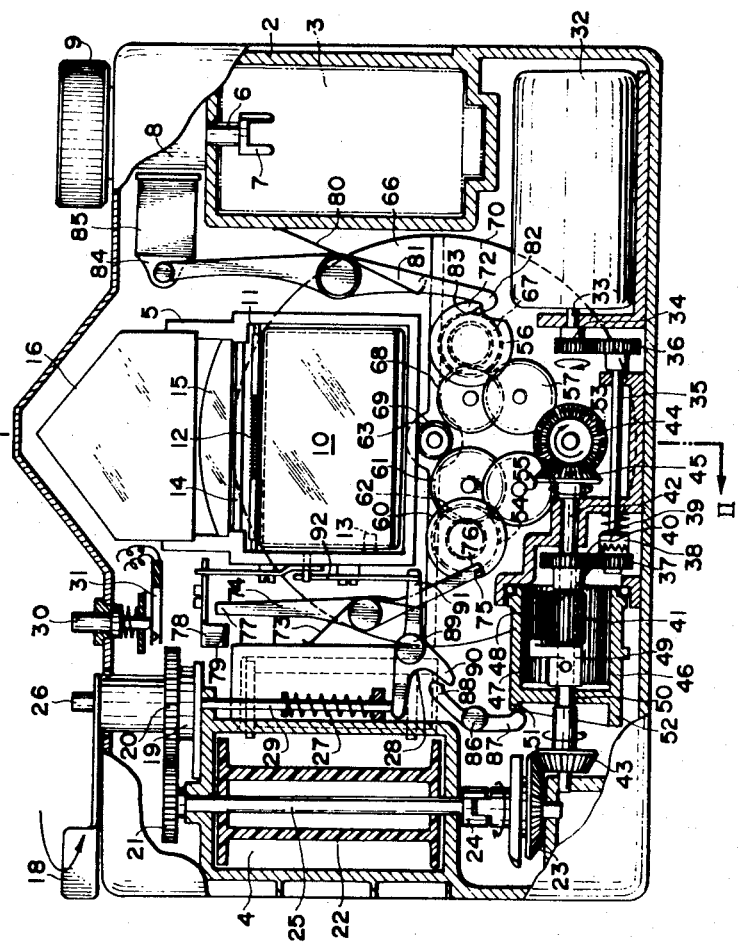
FIG. 1 is a front view in partial section of said embodiment.

In the drawings of the present invention, reference numeral 1 denotes an objective lens (see FIG. 2) and 2 a camera body. And, as shown in FIG. 1, a film delivery chamber 3 is provided on the right facing to the front of the camera, film take-up chamber 4 is provided on the left, and a mirror box 5 is provided at center.

Film rewinding shaft 6 is provided on its lower end with a fork portion 7 for engaging with a patrone not shown in the drawings in said film delivery chamber 3 and fixed to a rewinding knob 9 on its upper end, passing through bearing 8.

Mirror 10 is contacted with a pin 13 fixed to mirror box 5 to hold the mirror in a fixed position, the mirror being mounted within the mirror box by means of a shaft 11 coupled with the hinge portion on the upper end of said mirror 10 at a center of rotation, and held biassed outwardly by a spring 12, the mirror reflects the image forming light rays upwardly, as is well known, to direct them to a focusing glass 14, Fresnel lens and condenser portion 15, which conducts the rays to eye piece portion 17 through a pentagonal prism 16.

Manual winding lever 18 is connected with a winding gear 20 fitted in a bearing 19, and is connected with a spool gear 21 in meshing engagement with said winding gear 20. A spool shaft 25 is fixed to the spool gear 21, and said spool shaft is coupled with a spool 22 by means of a well known coupling means in film take-up chamber 4. Shaft 25 is provided on its lower end with a fork portion 24 for coupling film winding gear 23 to be hereinafter described.

A manual release button 26 is provided coaxially with manual winding lever 18 by any known means, is biassed upwardly by a spring 27 and is connected with an interlocking rod 29 which lower end is in contact with the left arm of an intermediate release lever 89 to be hereinafter described. Also, rod 29 passes slidably through bearing 19 and winding gear 20.

Near said manual release button 26, an automatically winding release button 30 is provided and formed so as to open/close a main switch 31 of an electric circuit for driving a motor (not shown in the drawings).

A gear 34, which is fixed to a shaft 33 of a motor 32 provided under film delivery chamber 3, is meshed with a gear 36 fixed to the right end of a connecting shaft 35. A gear 37 is mounted at the left end of shaft 35 in such a manner so that it will not slide in the axial direction.

Clutch 38 is also mounted at the shaft 35 left end so as to be slidable in an axial direction, thereby transmitting only the rotation from motor 32 to said gear 37 but rotatable along with said connecting shaft 35 and pressed into contact with said gear 37 by a spring 39.

An intermediate gear 40, in meshing engagement with said gear 37, is formed in a body with a sun gear 41 and is mounted on a main shaft 42. To the left end of main shaft 42, there is mounted a bevel gear 43 in meshing engagement with film winding bevel gear 23 coupled with fork portion 24 on the lower end of spool shaft 25 so as to take part in the winding of a film. To the right end of main shaft 42 there is fixed a transmission bevel gear 45 in meshing engagement with a bevel gear 44 for taking part in charging the shutter as to be described hereinafter. At the central portion of main shaft 42, a bracket 49 is mounted which has a supporting shaft for planet gear 48 in meshing engagement with sun gear 41 and an internal gear 47 provided in a cylinder 46, in addition to said sun gear 41 so as to form the differential gears.

One end of cylinder 46 is slidably and rotatably supported on the camera body by means of a well known ball bearing or the like. Main shaft 42 rotatably passes through bottom plate 50 thereof, along the periphery of which extends a solid cam, having low portion 51 and high portion 52.

Gear 53, formed as a unit with bevel gear 44 for effecting a charging of the shutter, is in meshing engagement under mirror box 5 with gear 55 for forming the gear train for the leading shutter plate system along with spring charge gear 54. Gear 53 is also in meshing engagement with gear 57 for forming the gear train for the following shutter blade system along with spring gear 56, as shown in FIG. 1, and formed so as to tension driving spring 58 for the leading shutter plate, shown in FIG. 2, and a driving spring for the following shutter plate, not shown in the drawings.

Figure 2:
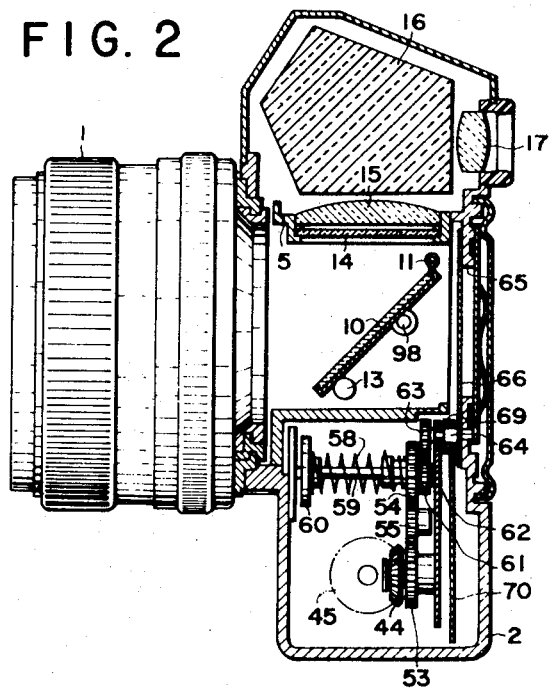
FIG. 2 is a side view in longitudinal section taken along line II—II in FIG. 1.

Both ends of driving shaft 59 for the leading shutter blade shown in FIG. 2 are rotatably supported on the camera base plate. One end thereof is also supported by a front side restraining plate 60 fixed to one end of driving spring 58 for the leading shutter blade, and the other end of shaft 59 is fixed to a rear film face side driving gear 62 meshed with intermediate gear 61 supported by the camera body 2. Spring charge gear 54 is mounted inwardly of gear 61 to which gear 54, the other end of said driving spring 58 for the leading shutter blade, is fixed.

Leading shutter plate gear 63 meshed with said intermediate gear 61 is fixed onto the front side of shaft 64 supported rotatably on the base plate, and leading shutter blade 66 for screening exposure opening 65 is fixed to the rear film face side of shaft 64.

The following shutter blade system is only partially shown in the drawings by omitting the approximate formation to the leading shutter blade system in the interest of clarity. Beneath the mirror box, driving gear 67, intermediate gear 68, and following shutter blade gear 69 intermesh with one another. The following shutter blade gear 69, formed as a unit with following shutter blade 70 similarly shaped as said leading shutter blade 66 and located in a symmetrical position, is fitted on said shaft 64. Also, restraining plate 72 is fixed to a following shutter plate driving shaft (not shown in the drawings) in the same way as in the case of leading shutter plate 66.

And, leading shutter plate 66 and following shutter blade 70 are formed so that the upper ends of the turning track thereof may be located beneath eye piece portion 17 and the lower ends of the turning track thereof may be close to the bottom of camera body.

A leading shutter plate restraining lever 74 is given a counterclockwise turning tendency by a spring 73 mounted on the film winding chamber 4 side of mirror box 5. The lower end 75 thereof engages with a notch portion 76 of said restraining plate 60, and upper end 77 thereof engages with a bent portion 79 of release lever 78 to be hereinafter described as movable by pushing.

It should be noted that lower end pawl 82 of following shutter blade restraining lever 81 tends to cut off the engagement with restraining plate 72 cocked by spring 80 from the time when the shutter is charged up to the time when magnet 85 is excited by the operation of the release. Hence, in order to maintain restraining plate 72 in the cocked position said end pawl 82 rotates clockwise following shutter blade restraining lever 81 against spring 80 by the other retaining member that is not shown in the drawings and, hence, maintains the engagement of said restraining plate 72 with said end pawl 82 and while said retaining member is retired from following shutter blade restraining lever 81 at the same time that the shutter release is operated, magnet 85 continues to rotate counterclockwise following shutter blade restraining lever 81".

Lower arm 87 of an automatic release lever 86 rotatably supported on the camera body beneath film winding chamber 4 is pressed slightly into contact with the solid cam face of said cylinder 46 by a spring not shown in the drawings. Upper arm 88 thereof is arranged to engage with lower arm 90 of a three armed intermediate release lever 89 rotatably supported on the camera body.

During both manual and automatic operation, left arm 28 of intermediate release lever 89 comes into contact with interlocking rod 29 for interlocking with manual release button 26 as described hereinbefore, and right arm 91 comes into contact with a starting lever 92 provided rotatably on the left side of mirror box 5.

Figure 3:
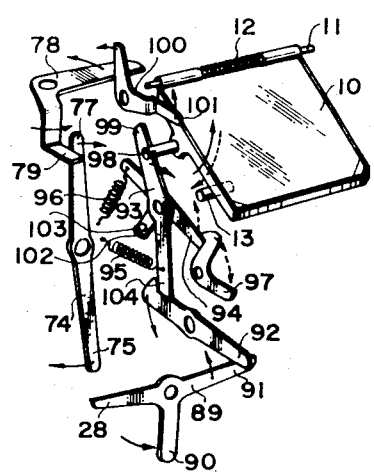
FIG. 3 is a perspective view showing the mirror operation mechanism.

In FIG. 3, showing the charge state of the mirror operation mechanism, on the left side of mirror box 5, mirror elevating lever 93 and a three-armed mirror lowering lever 94 are each pivotally supported on the camera body about a common axis, and are restrained respectively against springs 95, 96 by starting lever 92 and restraining lever 97 supported rotatably on the camera body.

A pin 98, fixed to the left side of mirror 10, protrudes outwardly of mirror box 5 and passes through a well known arc hole (not shown in the drawings) on the left side of mirror box 5, and is formed so as to be pushed upwardly by upper end 99 of mirror elevating lever 93 when the mirror elevates. And one end 101 of an intermediate lever 100 rotatably supported on the camera body protrudes into the upwardly turning track of pin 98, and the other arm thereof is formed so as to engage with release lever 78.

Further, a pin 103 is fixed to lower arm 102 of mirror lowering lever 94, and so that the mirror lowers pin 103 when 94 contacts it to move against spring 95 so as to rotate both levers 93, 94 as a unit.

Therefore, the automatic winding mechanism comprises gear 34, gear 36, connecting shaft 35, clutch member 38, gear 37, as well as motor 32, intermediate gear 40, and sun gear 41 in a body with said intermediate gear 40, and bevel gears 43, 45 on both ends of main shaft 42. The shutter driving mechanism comprising spring charge gears 54, 56, shutter plate driving shaft 59, driving gears 62, 67, intermediate gear 61, 68, and shutter plate gears 63, 69, are disposed in the space beneath mirror box 5 formed in need of the downward rotation of shutter plates 66, 70. On the other side, the manual winding mechanism comprises manual winding lever 18, winding gear 20, spool gear 21, spool shaft 25, and bevel gear 23; and said automatic winding mechanism is formed so as to be separated between gear 37 and clutch member 38 in the case of manual winding.

In operation of the embodiment in accordance with the present invention, as seen in the drawings showing the conditions at the time the film winding and the shutter charge are completed, during automatic shutter release upon pushing automatic winding release button 30, main switch 31 for the motor driving electric circuit is closed, motor 32 is rotated, and the rotation of gear 34 in the arrowed direction is transmitted to sun gear 41 as a unit with intermediate gear 40 through gear 36, clutch member 38 and gear 37.

The rotation of sun gear 41 rotates cylinder 46 through planet gear 48 and internal gear 47 of cylinder 46, so that automatic release lever 86 is rotated to the right by the solid cam face having low portion 51 and high portion 52.

Right arm 91, of three-armed intermediate release lever 89 rotated to left by being pushed by upper arm 88 of said automatic release lever 86, rotates starting lever 92 shown in FIG. 3 to the left to disengage from mirror elevating lever 93 and, accordingly, said mirror elevating lever 93 is rotated to the right by spring 95 and its upper end portion 99 pushes pin 98 upwardly to mirror 10 against spring 12.

Just before mirror 10 is completely elevated, finished pin 98 rotates intermediate lever 100 to the left to rotate leading shutter plate restraining lever 74 to the right through release lever 78 so as to disengage from restraining lever 60 which has restrained the rotation of the leading shutter blade system.

Under the shutter charge condition, spring charge gear 54 is restrained so that, by means of leading shutter plate driving spring 58, restraining plate 60 is released as described above, driving shaft 59 and driving gear 62 are rotated to rotate leading shutter plate 66 to the right through intermediate gear 61 and leading shutter blade gear 63 so as to start the exposure.

During interlocking with the picture opening operation of leading shutter plate 66, a well known exposure time control circuit (not shown in the drawings) is started and, by its action, the exciting current for magnet 85 is shut off after the time set up beforehand to distinguish the attraction for adsorb piece 84 and, spring 80 which follows shutter plate restraining lever 81, is rotated to the left to disengage from restraining plate 72 so as to start the picture closing operation of following shutter plate 70.

An interlocking mechanism (not shown in the drawings) for interlocking with the completion of picture closing operation of following shutter plate 70, rotates restraining lever 97 shown in FIG. 3 to the right to disconnect the engagement of said restraining lever 97 and mirror lowering lever 94, so that said mirror lowering lever 94 is rotated to the left by spring 96, and pin 103 of lower arm 102 engages with lower end 104 of mirror elevating lever 93 to push it to move against spring 95, whereby levers 93, 94 rotate as a unit. Therefore, mirror 10 is lowered by spring 12 to be restored to the condition prior to the shutter release.

Furthermore, leading shutter blade 66 and following shutter plate 70 come into contact with a retaining member (not shown in the drawings) to stop their respective rotation, after they are rotated nearly through the shutter release operation for actuating an exact exposure and for preventing the leakage of light to the film after the exposure is finished. Said retaining member is formed to interlock with restraining lever 74, so as to retreat from the retaining position with both shutter plates when restraining lever 74 is engaged with restraining plate 60, and to rotate into the position engageable with both shutter blades for retaining their respective rotation after they are rotated nearly through one round.

On the other hand, during manual shutter release, upon pushing manual release button 26, interlocking rod 29 is lowered against spring 27 to push down left arm 28 of intermediate release lever 89 being in contact with the lower end of said interlocking rod 28, so as to rotate said lever 89, and, accordingly, right arm 91 of said lever 89, rotates starting lever 92 shown in FIG. 3 to the left. The subsequent operations are the same as for automatic shutter release.

Next, operations from the exposure completion condition to the completion of film winding and shutter charge are, during automatic winding and shutter charge, arranged so as to close an interlocking switch (not shown the drawings) which is parallel with main switch 31 for a motor circuit (not shown in the drawings), and to start the operation of next film winding and shutter charge soon after the exposure is completed, whereby rotation of motor 32 is transmitted to sun gear 41 formed in a body with gear 40 through gear 34, gear 36, clutch member 38, and gear 37.

In this case, release lever 86 is in contact with the solid cam face provided on cylinder 46 so that the torque required for the rotation of cylinder 46 may be larger as compared to the torque for film winding and shutter charge. Therefore, said cylinder is not rotated and planet gear 48 moves around sun gear 41 while rotating on its own axis, so that main shaft 42 is rotated through bracket 49 and both bevel gears 43, 45 fixed respectively to both ends of said main shaft 42 are rotated.

And, rotation of bevel gear 45 during the leading shutter blade system, rotates gears 53, 55, 54 through bevel gear 44 for taking part in charging the shutter, so as to charge the leading shutter blade driving spring 58 shown in FIG. 2, and, during the following shutter plate system, rotates gears 53, 57, 56 so as to charge a following shutter blade driving spring, not shown in the drawings.

And, the rotation of bevel gear 43 rotates spool shaft 25 and spool 22 through bevel gear 23 to wind the film by one picture frame portion. However, when one picture frame portion is wound, a well known control device (not shown in the drawings) checks the rotation of said spool shaft 25 and spool 22 and acts to restrain main shaft 42 through bevel gears 23, 43, and thereby the rotation of motor 32 effected by the next shutter release rotates cylinder 46 through sun gear 41 and planet gear 48, notwithstanding that release lever 86 is in contact with the solid cam face in the shape of the larger resistance as described above.

During manual winding and shutter charge, by rotating manual winding lever 18 in the arrowed direction, spool shaft 25 and spool 22 are rotated through winding gear 20 and spool gear 21 to wind the film and simultaneously effect the shutter charge through bevel gear 23 coupled with fork portion 24 on the lower end of spool shaft 25, bevel gear 43, main shaft 42, bevel gear 45, and bevel gear 44, in the same way as in the case of automatic winding and shutter charge.

Here, in the same way as during automatic winding and shutter charge, release lever 86 is in contact with the solid cam face in the shape of the larger resistance, cylinder 46 is not rotated, and the rotation of main shaft 42 rotates intermediate gear 40 formed in a body with sun gear 41 in the arrowed direction through planet gear 48 to rotate gear 37 meshed with said intermediate gear 40; however, it cannot rotate shaft 35 because of the slide between clutch member 38 and said gear 37.

It should be noted, in the embodiment in accordance with the present invention that the electric shutter of the pursuance type in which the leading shutter blade and the following shutter blade are separately provided as a rotary shutter, is disclosed but not restricted to this type. For example, a type in which the angular aperture between the leading shutter plate and the following shutter plate is manually set up beforehand in accordance with the exposure time, a type in which the rotation speed is controlled by a fixed angular aperture, and the like, can be used. As to said control means, the mechanically speed control, the electrically speed control, or the combination of mechanically speed control and electrically speed control can be used as well.

Also, as to the specific configuration of the camera, the film delivery chamber and the film winding chamber maybe located not only on the ends of both sides of the camera body but also on the back of the camera body, and may be embodied in the film back interchangeable type, so that without deviating from the spirit of the present invention, various modifications can be made.

What is claimed is:

1. In a single lens reflex camera in which a film is transported horizontally in a normal camera position, a combination comprising:

a camera body including a rectangular exposure aperture having a dimension in the longitudinal direction of the film greater than the width of the film;

an objective lens;

a view finder system having a focusing plate horizontally disposed above said exposure aperture and a reflecting member for reflecting light passing through the objective lens onto the focusing plate;

a blade member pivotally mounted on a shaft which is disposed beneath and near the center of the lower side of said exposure aperture, said blade member being pivotable in a region extending to a location near the bottom of said camera body;

a shutter driving mechanism for effecting film exposure by rotating said blade member;

a driving motor;

a film take-up member;

a first transmission for transmitting the movement of the motor to said film take-up member for the film transportation;

a second transmission for transmitting the movement of the motor to said shutter driving mechanism and charging the mechanism simultaneously with said film transportation;

a shutter release mechanism; and an operating member driven by said driving motor for actuating the shutter releasing member, said shutter driving mechanism, said driving motor, said two transmissions and said operating member being disposed between the lower side of said exposure aperture and the bottom of the camera body.

2. A single lens reflex camera as set forth in claim 1 wherein said shutter driving mechanism comprises:

a gear driven through the second transmission by the driving motor and connected to a coil spring for charging said coil spring;

a shaft having a driving gear being connected to said coil spring and a restraining plate, said shaft loosely extending through said coil spring and said gear for charging said coil spring;

a restraining member being biased for engaging with said restraining plate and movable to release said restraining plate through the shutter release operation; and a leading shutter blade engaged with said driving gear for initiating the exposure in said blade member.

3. A single lens reflex camera as set forth in claim 2 wherein said shutter driving mechanism further comprises:

a second gear driven through the second transmission by the driving motor and connected to a second coil spring for charging said second coil spring;

a second shaft having a second driving gear being connected to said second coil spring and a second restraining plate, said second shaft loosely extending through said second coil spring and said second gear for charging said second coil spring;

a second restraining member movable between a restraining position for engaging with said second restraining plate to a rest position for releasing said engagement which is actuated through a timing device after said leading shutter blade is released; and a following shutter blade engaged with said second driving gear for shielding the exposure in said blade member.

4. A single lens reflex camera as set forth in claim 1, further comprising:

a manually rotated member connected to the film take-up member;

a main shaft rotatably mounted in said camera, the rotation thereof being transmitted to said film take-up member through the first transmission and being transmitted to the shutter driving mechanism through the second transmission; and a clutch means provided between the driving motor and said main shaft for transmitting the rotation of said driving motor to said main shaft and intercepting the transmission of the rotation of said main shaft to said driving motor.

5. A single lens reflex camera as set forth in claim 4, further comprising:

a gear connected with the driving motor through the clutch means, and fitted on the main shaft;

a sun gear fixed to said gear coaxially for being fitted on said main shaft;

a planet gear meshed with said sun gear and fixed to said main shaft;

a cylinder fitted on said main shaft coaxially with said sun gear, which has a cam formed on one end face thereof and an internal gear being meshed with said planet gear; and an automatic release lever pivoted on said camera so that one arm thereof is frictionally engaged with said cam for retaining the rotation of said cylinder while the film is wound, and for releasing the rotation of said cylinder against said friction when the film winding is finished to suspend the rotation of said main shaft and to move said automatic release lever, the other arm of which is engageable with an intermediate release lever connected to a manually operated release button.

\* \* \* \* \*